(12) United States Patent
Garcera et al.

(10) Patent No.: US 6,375,014 B1
(45) Date of Patent: Apr. 23, 2002

(54) GRADED PERMEABILITY MACROPOROUS SUPPORT FOR CROSSFLOW FILTRATION

(75) Inventors: Daniel Garcera, Tarbes; Edouard Toujas, Bazet, both of (FR)

(73) Assignee: Societe des Ceramiques Techniques, Bazet (FR)

( * ) Notice: Subject to any disclaimer, the term of this patent is extended or adjusted under 35 U.S.C. 154(b) by 0 days.

(21) Appl. No.: 09/054,199

(22) Filed: Apr. 2, 1998

(30) Foreign Application Priority Data

Apr. 9, 1997 (FR) ............................................. 97 04359

(51) Int. Cl.$^7$ ............................................. C01D 29/00
(52) U.S. Cl. ..................... 210/490; 210/496; 210/506; 210/510.1; 55/523; 55/524
(58) Field of Search ............................. 210/433.1, 490, 210/496, 506, 510.1, 637, 483; 55/523, 524; 428/398, 399; 427/256

(56) References Cited

U.S. PATENT DOCUMENTS

| | | | |
|---|---|---|---|
| 4,105,547 A | * | 8/1978 | Sandblom |
| 4,390,355 A | * | 6/1983 | Hammond, Jr. et al. |
| 4,704,143 A | * | 11/1987 | Percy |
| 4,719,058 A | | 1/1988 | Komoda |
| 4,746,341 A | | 5/1988 | Komoda |
| 4,761,233 A | | 8/1988 | Linder et al. |
| 5,122,270 A | * | 6/1992 | Ruger et al. |
| 5,223,318 A | * | 6/1993 | Faber et al. |
| 5,409,609 A | * | 4/1995 | Soria et al. |
| 5,454,947 A | * | 10/1995 | Olapinski et al. |
| 5,895,572 A | * | 4/1999 | Joulin et al. |
| 6,110,368 A | * | 8/2000 | Hopkins et al. |

FOREIGN PATENT DOCUMENTS

| | | | |
|---|---|---|---|
| BE | 1000795 | | 4/1989 |
| DE | 2635167 | | 10/1977 |
| DE | 3523068 | | 1/1987 |
| GB | 1557899 | * | 12/1979 |
| JP | 02014724 | | 1/1990 |
| JP | 08266837 | | 10/1996 |
| WO | 88/03829 | * | 6/1988 |

* cited by examiner

*Primary Examiner*—Ana Fortuna
(74) *Attorney, Agent, or Firm*—Townsend and Townsend and Crew LLP

(57) ABSTRACT

A macroporous support is disclosed, the permeability of the support varying in the direction of flow of a fluid to be treated, mean porosity increasing in the direction of flow. A method for preparing it and its use for cross-flow filtration are also disclosed.

26 Claims, 1 Drawing Sheet

GRADED PERMEABILITY MACROPOROUS SUPPORT FOR CROSSFLOW FILTRATION

BACKGROUND OF THE INVENTION

The present invention relates to a macroporous support having a permeability gradient along the path of flow of a fluid to be treated, and to a method for producing it. The invention notably relates to such a macroporous support in sintered ceramic, sintered glass, sintered metal, or carbon material, provided with one or several longitudinal parallel channels, the surface of said channels being covered with one or several filtering layers in a sintered ceramic or organic material, in which a liquid to be purified or concentrated, or generally speaking a fluid to be treated, circulates. The assembly comprising the macroporous support and the filtering layer is referred to below as the membrane.

In such a device, the fluid to be treated enters an inlet chamber at one inlet end of the (macro)porous support or block and flows through the channels to the outlet end towards an outlet chamber, a portion of the liquid to be treated, or permeate, passing radially through the layer and the macroporous support, and being collected in a permeate-side outlet chamber.

According to the cross-flow filtration principle, the liquid to be treated circulates along the channel(s), and this flow leads to a pressure drop between the inlet and outlet of said channels. This pressure drop depends on a set of parameters such as, for example, the speed of the liquid to be treated or purified in the channel, its viscosity, as well as the hydraulic diameter of the channel. This decreasing variation in fluid pressure along the channel(s) modifies the transverse flow of the permeate passing through the filtering layer and then the macroporous body.

This results in a decreasing transmembrane pressure, i.e. in the difference between the pressure at a point in the channel and the pressure in the permeate chamber, in the direction of circulation of the liquid in the channel(s). This decreasing variation can affect the performance of the filtration device, by, for example, reducing the permeate throughput, and by modifying, for example, the retention threshold, and can also lead to different filtration conditions prevailing along the channel(s).

For example, in a conventional membrane having 4 mm diameter channels, the inlet pressure to the channels is 3.8 bar, the channel outlet pressure is 2 bar, while the pressure inside the permeate outlet chamber is constant, for example 1.5 bar. Thus, the transmembrane pressure varies along the membrane between 2.3 and 0.5 bar.

With such a conventional membrane, the set of dimensional parameters, associated with the geometry of the filtering element, hydraulic parameters associated with the liquid to be treated and with the operating conditions, do not make it possible to fully optimize the filtering operation as it is impossible to provide the optimum transmembrane pressure at all points along the membrane.

State of the Art

U.S. Pat. No. 4,105,547 discloses a cross-flow filtration device using an auxiliary longitudinal pressure drop compensation system. This is achieved by arranging for the outer surface of the support at the permeate side to be swept by permeate circulating in the same direction as the liquid to be treated so as to thereby set up a longitudinal pressure drop in the permeate chamber so that the transmembrane pressure remains approximately constant along the filter.

EP-A-0,333,753 discloses an embodiment of this device making it possible to compensate the transverse pressure loss variation set up by the circulation of a liquid inside one or several channels. Like the previous device, it is provided for permeate to circulate at the outer surface of a tubular membrane, of a porous support having a channel or, of a porous block also having one or several channels. The filtering media can be assembled into a one-piece structure or a bundle inside a housing in which the permeate chamber is filled with filling bodies such as ball or pellets which set up resistance to longitudinal flow of the permeate suitable for counter-balancing the longitudinal pressure loss caused by the liquid to be treated circulating in the channel(s) covered with a filtering layer.

These two prior art systems require a permeate recirculation loop, driven by a circulation pump, to be set up, the latter being required to provide the desired pressure head. Such systems of necessity employ specific casings or enclosures in which a permeate circulation can be set up at the outer surface of the filtering media and in the same direction as the circulation of the liquid to be treated inside the channel(s).

These prior art devices suffer from several disadvantages, such as:

cost overhead of providing the recirculation loop and its control and regulation system;

energy costs associated with the operation of this additional loop;

supplementary costs associated with the specific nature of the outer casing(s).

SUMMARY OF THE INVENTION

The invention thus sets out to provide a cross-flow filtering device which is simple, requires no adaptation of existing equipment, and involves no additional energy costs.

Thus, the invention provides a macroporous support for cross-flow filtration, said support having a permeability gradient in the direction of flow of the fluid to be treated.

The invention also provides a macroporous support for cross-flow filtration having a mean porosity gradient at a belt region in the direction of flow of the fluid to be treated, mean porosity increasing in said direction of flow.

According to one embodiment of the macroporous support, the mean porosity gradient corresponds to an impregnation gradient starting from the outer surface of said support.

According to a further embodiment of the macroporous support, the diameter of the pores in the impregnated region is comprised between 0.1 and 0.8 times the pore diameter in the non-impregnated region, preferably between 0.3 and 0.5.

According to one embodiment of the macroporous support, the ratio between outlet mean porosity and inlet mean porosity is comprised between 1.1 and 4.

According to another embodiment of the macroporous support, the level of initial porosity is comprised between 15 and 45%.

The invention also provides a membrane comprising the above macroporous support in association with a filtering layer.

The invention also provides a method for preparing the macroporous support comprising the step of immersing an initial macroporous support with its lower end closed, in a slurry or in an organic solution in a substantially vertical position.

According to one embodiment of the method, the dwell time is comprised between 0 and 15 sec., preferably between 0.5 and 8 sec. for those parts which are respectively least and most immersed.

One embodiment of the method for preparing a macroporous support comprises the step of spraying a slurry or an organic solution onto a normal macroporous support, the spraying region being moved along said support.

According to one embodiment of the method, the speed of movement of a spraying nozzle is comprised between 0.1 cm/s and 3 cm/s, preferably 0.7 cm/s and 1.7 cm/s.

According to another embodiment of the method, the throughput of sprayed material is variable along the support, the speed of displacement of the spraying nozzle being constant.

According to one embodiment of the method, the throughput of sprayed material is constant and the speed of movement of the spraying nozzle varies along said support.

In one embodiment, the method of preparing the macroporous support comprises the step of saturating a normal macroporous support with water and then the step of injecting gas into said support, the outlet end of which is free, partially closed off or completely closed off, and the step of immersing, in a substantially horizontal position, the support in a slurry or an organic solution.

The invention also provides a macroporous support saturated with liquid, having a gradient of its free volume.

The invention also covers the use of a macroporous support as defined above for cross-flow filtration.

The invention also covers the use of a membrane as defined above for cross-flow filtration.

BRIEF DESCRIPTION OF THE DRAWINGS

The invention will be described below, with reference to the attached drawings in which.

DETAILED DESCRIPTION OF PREFERRED EMBODIMENTS

Macroporous Support

Figure 1:
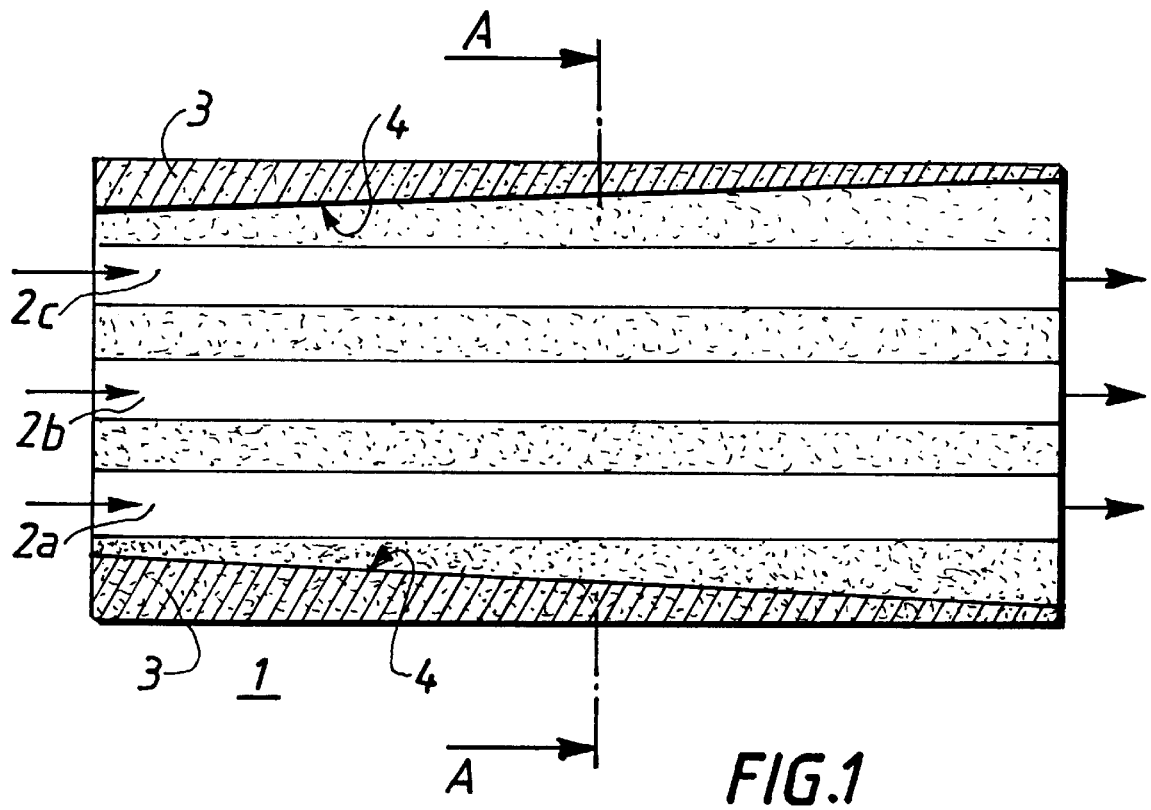
FIG. 1 is a section taken along the longitudinal axis of a support in one embodiment of the invention.

The term "macroporous support" is used in its ordinary meaning for the person skilled in the art, and notably covers supports for membrane filtration, including hollow fibers. The term "unmodified or initial porosity" signifies the porosity of the macroporous support before applying the treatment according to the invention. Porosity signifies the volume of the pores of the support, expressed as a volume percentage based on the volume of the support. An "initial" support is a support prior to applying the treatment according to the invention. Generally speaking, an "initial" macroporous support shows a pore diameter above 4 $\mu$m, typically between 4 and 50 $\mu$m.

The term "modified porosity" signifies the porosity of that region of the support that has been modified by applying the treatment according to the invention.

According to the invention, the mean porosity of a transverse slice of given thickness of the macroporous support varies increasingly in the longitudinal direction of said support, this being the direction of circulation of the liquid to be treated, so that the permeability of said support in the transverse direction, varies in a similar fashion in the longitudinal direction. The term "mean porosity" signifies the average value of porosity between modified regions and unmodified regions of the macroporous support. This permeability gradient creates a longitudinal gradient for transmembrane pressure of the permeate through the support, this longitudinal gradient being approximately equal to the longitudinal pressure gradient of the liquid to be treated in the channel. The result of this is that the transmembrane pressure between the inside of the channel and the interface between the filtering layer and the support is approximately constant over the whole length of the membrane, which makes it possible to optimize filtration without requiring the use of auxiliary equipment.

This permeability gradient is obtained notably through a mean porosity gradient, which will be described in more detail below. The same result is obtained by modifying pore diameter either in the bulk of the support or in the region of the support comprised between the outer surface of the support at the permeate side, and the wall of the channels passing therethrough, which will be referred to below as the "belt" of the support.

Various methods and embodiments are available for achieving the above objectives. A first embodiment consists in impregnating the macroporous support over a portion of its thickness, starting from its outer surface. The demarcation line delineating where impregnation stops can either be sharp or less clearly defined. In this embodiment, there is consequently modification of the mean porosity of the support. In another embodiment, a layer of decreasing thickness is deposited on the outer surface of the support, on the permeate side, this layer having a smaller pore dimension than that of the pores of the support. These two embodiments can be combined. In a third embodiment, the porosity gradient is obtained directly while the macroporous support is being manufactured, by, for example, continuously modifying the amount of a pore-generating agent, over the length of the support during its extrusion through, for example, a screw extruder or by using a temperature gradient while sintering the macroporous support and/or for example, varying the speed when a continuous furnace is used.

With reference to FIG. 1, the support according to the invention 1 includes channels 2a, 2b and 2c, and has, at its outer surface, a region impregnated with a material which is illustrated by the cross-hatched region 3. The arrows show the direction of liquid flow. In the embodiment shown, there is a sharp demarcation line 4; this line however may be less clearly defined.

Figure 2:
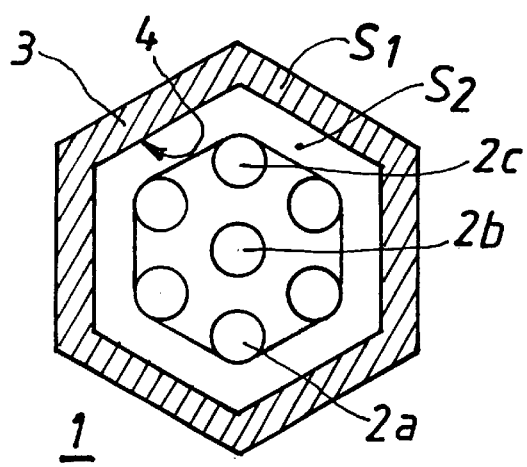
FIG. 2 is a transverse cross-section of a support in one embodiment of the invention.

With reference to FIG. 2 which is a section along line A—A, the same support is shown, bearing the same references. The cross-section of the belt corresponds to the sum of the surfaces S1 and S2, which are the surfaces of cross-section of, respectively, modified and unmodified regions. The demarcation line is the same as that shown in FIG. 1.

According to the invention, the support has a mean porosity gradient (Pm) in its longitudinal direction. The mean porosity is calculated conventionally by means of an integral Pm=∫PdS in which P is the porosity at a point and dS is the surface element in the section of support considered, integration covering the whole surface of the section of the belt.

In the particular case described in FIGS. 1 and 2, the mean porosity can be calculated as a mean value between the porosity of the modified region and the porosity of the unmodified region, over the surface of the section of the belt. This mean value is defined in terms of surface area. Those elements needed to calculate mean porosity are indicated on FIG. 2. On FIG. 2, in which a very clear demarcation line can be seen, mean porosity Pm can be calculated as follows:

Pm=[(P1×S1)+(P2×S2)]/(S1+S21) in which P1 and P2 are the respective porosities of the modified region of surface area S1 and of the unmodified region of surface area S2.

In one embodiment of the invention, the device is a macroporous block having one or several channels optionally covered with a filtering layer, and impregnated, starting from the outer surface at the permeate side, to a decreasing extent in the direction of its length, at least over a part of its thickness, with an inorganic or organic material so as to thereby reduce the porosity of the impregnated region compared to that of the non-impregnated region. The ratio of mean porosity at the outlet end of the macroporous block to the mean porosity at the inlet end of the macroporous block is comprised between 1.1 and 4. This variation in porosity makes it possible to set up a variation in transmembrane pressure which is substantially equivalent to longitudinal pressure drop caused by the liquid to be treated, circulating in the channel(s). Indeed, while passing through the macroporous support, the permeate meets with additional resistance to flow in the impregnated region, which has a lower porosity than that of the non-impregnated region. This constraint increases as thickness of the impregnated region increases, and thus needs to be larger at the entry for the fluid to be treated.

Such a filtration device thus has a defined direction of circulation for the liquid to be treated, meaning that the most impregnated end of the porous block will be arranged at the inlet chamber end for the liquid to be treated, the other only slightly-impregnated end being arranged at the treated liquid outlet chamber end.

Under these operating conditions, a longitudinal pressure drop is set up between the input end of the macroporous support and its outlet end which is sufficient to allow a fraction of the liquid to be processed circulating in said channel(s), to pass through the filtering layer and the macroporous support.

The transmembrane pressure is defined so as to obtain filtering conditions that are compatible with the nature of the liquid to be treated. It will thus have been adapted in advance to the speed at which the fluid to be treated circulates in the channel(s), and to the viscosity and filtration throughput characteristics of said fluid. As against this, to carry out filtration with a given membrane according to the invention, the speed at which the liquid to be filtered circulates in the channels is adapted so as to obtain a longitudinal pressure drop gradient in the channels that is equal to the longitudinal gradient of transmembrane pressure to which the permeate is subject.

The porosity of the modified region together with the decrease thereof in the longitudinal direction of flow of the fluid to be treated results in good homogeneity of transmembrane pressure between the inside of the channels and the interface between the filtering layer and the macroporous support along the channel(s), and thus homogeneity of the permeation flow.

The material used to impregnate the macroporous block and control its porosity can be a ceramic material having the same composition as that of the macroporous block. In this case, the corrosion resistance of the filtration device is at least as high as that of the porous block.

Where the impregnation material has the same composition as that of the macroporous block, their coefficients of expansion are obviously the same. In this case, there is no danger of crack formation that might arise through thermal stresses during manufacture, or during use with hot fluids, or sterilization using steam.

If, additionally, the impregnation material is obtained from a powder having the same composition as that from which the filtering layer is obtained, and a sintering temperature that is compatible therewith, there is no need to carry out separate sintering operations for the sintering layer and the impregnation material. In this case, the impregnation has no influence on the sintering operations conventionally carried out for producing ceramic filter elements.

The impregnation material, as stated, can be of the same nature as that of the macroporous support material, in other words inorganic, and be introduced into the support in the form of a suspension or slurry. If the material is of organic origin, it can be any resin and, for example, an epoxy resin or a polymer and, for example, PTFE introduced in the form of a suspension. The impregnation solution or composition has a suitable viscosity, for example comprised between 15 and 400 mpa.s, preferably 30 to 100 mpa.s.

Method of Preparation

Manufacture by Dipping

When, notably, the impregnation material is ceramic or polymer material, the method for manufacturing the filtering device comprises the steps of preparing a deflocculated slurry from a powder of ceramic or polymer material having a mean particle size comprised between 0.1 and 4 micron, and with a viscosity suitable for the present dipping technology, the ceramic or polymer material powder concentration being comprised between 2.5 and 75% by volume, as a function of the thickness of the porous block it is desired to impregnate, followed by a step of progressively dipping the porous block with the ends of the channels closed off, into this slurry, preferably while agitating the latter, followed by the step of sintering the impregnation material.

In this technique, it is preferable to impregnate the porous block in a vertical or oblique position, the dipping time being comprised between 0 and 15 seconds and, preferably, between 0.5 and 8 seconds for, respectively, those regions that are immersed for the shortest time (which will give a mean porosity closest to the initial porosity) and regions where immersion has lasted longest (which will produce a mean porosity most different from that of the initial porosity).

Impregnation is carried out at a step in the process where there is no danger of modifying the characteristics of the membranes at their ultimate stage of sintering and/or so that the following steps in the process do not lead to deterioration of the physical characteristics of impregnation, such as, for example, the permeability of the impregnated region.

Impregnation can only be partial (in the length direction), in one region of the macroporous support.

In a second alternative embodiment, a technique in which the porous support is progressively pre-saturated can be employed, this being characterized in that the porous block is saturated with a liquid, preferably water, which is blown by means of compressed air through the channels, from one of the ends of the porous body, the other end being unobstructed, partially closed off or totally closed off, in order to establish a pressure drop which is sufficient to progressively eliminate, in the longitudinal sense of the porous block, the liquid held in the porosity of said block, after which the porous block is dipped in a vertical, oblique or horizontal position, into a slurry based on ceramic or polymer material, as described above. The slurry will come to occupy the free porous volume that was progressively made available by blowing, without the dwell time of the porous block in the slurry having any appreciable influence on penetration into regions only intended to be slightly impregnated.

This support, saturated with liquid, and having a conically-shaped free volume, is also an element of the invention.

To ease penetration of the slurry into the volume not occupied by the pre-impregnation liquid, one could also put the porous block under vacuum.

When this air blowing technique is used, it is preferable to carry out impregnation of the porous block in a horizontal position.

The technique above produces an impregnation demarcation line which is substantially well defined.

Process Using Spraying

Other means able to notably create a porosity gradient in the porous block, such as for example spraying of a slurry can be employed. When the impregnation material is a ceramic or polymer material, such a manufacturing method comprises using a slurry the ceramic or polymer material concentration of which is comprised between 1 and 60% by volume, and which is projected, using for example compressed air, through a spraying nozzle that moves opposite the outer surface of the porous block, which is rotating about its longitudinal axis.

The movement of the nozzle can be progressive, in other words at variable speed (increasing or decreasing) with constant nozzle throughput or the speed can be constant and the throughput variable. The speed and throughput can also both vary simultaneously.

When this technique is used, projection of the slurry can also be accomplished without using compressed air. In this case, the tank containing the slurry is pressurized.

Another technique can also be used consisting in using a high-pressure liquid pump downstream of the nozzle.

The above technique produces an impregnation demarcation line which is substantially not clearly defined.

When the impregnation material is a resin, it can be deposited, in one of several methods, by making a homogeneous blend of resin, the required amount of hardener and a diluting agent which reduces the viscosity of the blend, and then projecting the preparation using a spray nozzle which is progressively moved opposite the porous block surface which itself is rotating about its longitudinal axis, the resin then being heat-cured.

The temperature cycle is, among other things, defined so as to encourage lowering of viscosity so as to aid migration of the resin into the porosity of the block, thereby only partially obstructing the porosity of the block.

Like the case above, it can be envisaged to impregnate the porous body using a two-component resin employing a cold-curing catalyst, which is diluted so as to obtain a viscosity suitable for only partially obstructing the porosity of the block.

Like the case above, single-component-type resins can also be used, which are diluted under the same conditions, and are then deposited and cured employing suitable temperature cycles.

Additionally, where the above-cited types of resins are employed, impregnation can also be achieved by progressively dipping the porous body into a diluted solution of resin of the type such as described above and then carrying out curing by chemical reaction either cold or with application of heat.

The following examples illustrate the invention without limiting it.

EXAMPLE 1

An alumina-based aqueous slurry was prepared having a mean particle diameter of 0.4 micron, which was defloculated using polyacrylic acid such as Darvan C® followed by ball milling.

In volume percentage, the slurry consisted of:

| | |
|---|---|
| Alumina AES-11 | 43% |
| Darvan C | 3.3% |
| Water | 53.7% |
| Viscosity | 70 mPas |

The support or macroporous block was 1020 mm long, and had nineteen 4 mm diameter channels, defining a 2 mm wide belt. It had an initial porosity of 33% and an initial pore diameter of 12 $\mu$m. This porous block was impregnated using a dipping device comprising a clamp firmly grasping the macroporous support in a vertical position, a guide rail for the clamp, driven by a servo-motor, and semi-permeable plugs for closing off the channels of the macroporous support. The macroporous support, held by the clamp, was progressively immersed in the slurry contained in a tank fitted at the bottom with a stirring device for the slurry, adapted to keep the aqueous suspension homogeneous.

The clamp was driven until the support was completely immersed in the bath, and then withdrawn. The drive was programmed so that the linear speed of movement of the support was substantially constant, the absolute value of the speed being about 25.5 cm/s, whereby the dwell time of the portion that was in contact with the slurry for the shortest time was about 0.5 s while the dwell time for that portion that was longest in contact with the slurry was about 8 s.

Following this, the thus-modified macroporous support was dried and sintered at 1480° C. for 5 hours.

Sections were taken through the macroporous support which enabled the depth of impregnation to be measured, this being 2 mm at the inlet end and 0.2 mm at the outlet end of the macroporous support. A sharp demarcation line was seen, and impregnation was linear throughout the outer thickness of the macroporous support.

The impregnated region had a porosity of 8% compared to that of the non-impregnated region (initial porosity) which was 33%. Mean porosity along this support, calculated at the belt varied between 30.5 and 10.5, giving a ratio between inlet and outlet of 2.9. Pore diameter of the modified region, measured by mercury porosimetry was 4 $\mu$m, equivalent to 0.33 times the initial pore diameter.

EXAMPLE 2

A filtering layer in zirconia having a 0.1 $\mu$m pore diameter was deposited on a modified support such as the one described in Example 1.

The membrane was divided into 1 cm wide sections. On each section, transverse permeability to water was measured by applying a 1 bar pressure difference between the channels and the outer surface. A throughput of 1.5 liter/H equivalent to a permeability of 640 l/Hm$^2$ bar) was obtained for the inlet section to the membrane, and for the outlet section a throughput of 4.7 l/Hm$^2$ bar (equivalent to a permeability of 200 l/Hm$^2$ bar). The ratio of transverse permeabilities between the two sections was thus 0.32.

EXAMPLE 3

An aqueous water-based slurry was obtained having an average particle size of about 1 $\mu$m which was deflocculated using etherphosphoric alkylpolyglycol acid (EMPHOS® PS21A) and this was then ball milled.

The composition by volume of this slurry was:

| | |
|---|---|
| Alumina A.16 | 37.3% |
| EMPHOS ® PS21A | 1.8% |
| Water | 40.9% |
| Ethanol | 20% |
| Viscosity | 27 mPas |

A macroporous tube having an initial porosity of 45% and an initial pore diameter of 15 μm was employed. The tube was covered with a filtering layer having 3 μm diameter pores, the belt being 3 mm wide.

The outer surface of this membrane was impregnated by projecting the slurry. To achieve this, the macroporous support was rotated at about 100 rpm about its longitudinal axis.

A nozzle supplied under pressure projected the slurry onto the outer surface of the membrane. This nozzle moved parallel to the tube axis progressively. The speed of linear movement progressively increased from 0.7 cm/s to 1.7 cm/s, thereby obtaining a variation in the amount of slurry projected as a function of the longitudinal position of the outer surface element concerned.

After drying and sintering at 1625° C. for 3 hours, a modified membrane was obtained.

Sections were taken through the membrane and it was found that the impregnation demarcation line was not clearly defined, the mean depth of impregnation being 1.7 mm at the inlet end and 0.5 mm at the outlet end from the support. It was noted that impregnation was linear through the outer thickness of the macroporous support.

The porosity of the impregnated region was 12% and mean porosity, along the support, calculated at the belt varied from 39.5 to 26.3, giving a ratio between inlet and outlet of 1.5. The pore diameter of the modified region, measured by mercury porosimetry, was 10.5 μm, equivalent to 0.7 times the initial pore diameter.

EXAMPLE 4

The same slurry, diluted with water so as to obtain a volume concentration in alumina of 1% was projected onto the porous membrane of example 3.

The projection nozzle moved at a constant speed of 0.1 cm/s, but its throughput increased progressively from 1 1/min to 26 1/min.

As above, after sintering, mean porosities were determined by taking slice sections. The impregnation demarcation line was not distinctly defined. Mean penetration depth varied from 0.5 mm in the most modified region to 0 mm in the least modified region. The porosity of the impregnated region was 20%. Mean porosity along the support, calculated at the belt varied from 45 to 40.8, equivalent to a ratio of mean porosity of 1.1. The pore diameter of the modified region, measured by mercury porosimetry, was 7.5 μm, equivalent to 0.5 times the pore diameter of the unmodified region.

The membrane was divided into 1 cm wide sections. For each section, water permeability was determined by applying a 1 bar pressure difference between the channel and the outer surface. A permeability of 13 m3/Hm$^2$ bar for the inlet section of the membrane and 27 m3/Hm$^2$ bar for the outlet section were obtained. The ratio between the permeabilities was thus 0.48.

EXAMPLE 5

A macroporous block of 850 mm length and carrying 19 channels of 3 mm diameter covered by a filtering layer with a pore diameter of 0.45 μm was employed. A belt 1 mm wide was defined. This membrane was characterized by an initial porosity of 15% and an initial pore diameter of 4 μm. This membrane was dipped into a tank of water so as to saturate the porosity of the support. The membrane was removed from the tank and one end was partially closed, and clean dry compressed air was blown into it from the free end of the channels. This enabled a portion of the water contained in the membrane to be removed, thereby obtaining a conical water gradient in the macroporous support. The part was then immersed, using the device described in example 1, in an aqueous suspension having 65% volume PTFE, the PTFE particles having a diameter of 0.1 μm.

The speed of immersion of 113 cm/s was constant. As soon as the membrane was immersed, it was immediately withdrawn at the same speed, so that the dwell time of that part which was the least time in contact with the slurry was 0 s, while the dwell time of that part which was the longest in contact with the slurry was about 15 s.

After this, the thus-modified macroporous support was dried and sintered at 300° C. for ½ hour.

By taking slice sections in the macroporous support, the depth of impregnation was measured to be 0.9 mm at the inlet end and 0 mm at the outlet end of the support. It was noted that impregnation was linear in the outer thickness of the macroporous support.

The impregnated region had a porosity of 4%. Mean porosity along the support, calculated at the belt varied from 15 to 5.1 giving a ratio between inlet and outlet of 2.9. Pore diameter of the modified region, measured by mercury porosimetry, was 0.4 μm, equivalent to 0.1 times the initial pore diameter.

EXAMPLE 6

An epichloridrine-based epoxy resin type DJEBA DER 331 (available from Dow-Chemical) was prepared and mixed with a phenylene-diamine-based hardener, and then with a methyl ethyl ketone-type solvent making it possible to obtain a 60% resin volume concentration, and to reduce the viscosity of the mixture. The present example was carried out at a temperature of about 20%C.

A ceramic element characterized by an initial porosity of 30%, an initial pore diameter 8 μm and a belt thickness of 4 mm was modified. The element was rotated at about 60 rpm and the said mixture was projected via a spaying nozzle moving parallel to the axis of rotation of the porous body, the speed of movement thereof varying progressively between 0.1 cm/s and 3 cm/s, so as to obtain a penetration gradient for the resin along the ceramic element.

The thus-treated part was kept rotating until the solvent phase had been eliminated and the resin had fully cured. This operation is preferably done at constant temperature.

The line demarcating impregnation was not clearly defined and the maximum porosity of the impregnated region was 4%. Taking slices of the support made it possible to estimate depth of penetration to be 3.5 mm at one end and 0.2 mm at the other end. Mean porosity along the support, calculated at the belt, varied from 7.2% to 28.7%, equivalent to a ratio of mean porosity of 4. Additionally, pore diameter was 1 μm equivalent to 0.12 times the initial diameter.

What is claimed is:

1. A macroporous support for cross-flow filtration of a fluid to be treated, said support comprising at least one longitudinal channel, said longitudinal channel adapted to receive said fluid to be treated circulating therealong, said support having an impregnated region and a non-impregnated region of different permeabilities, said impregneated and non-impregnated regions fixedly defined in said support, said support having a permeability gradient increasing in said longitudinal direction, said permeability gradient defined by said impregnated and non-impregnated regions, said support adapted for passing said fluid to be treated from an area of lower permeability to an area of higher permeability.

2. The macroporous support according to claim 1, in which the permeability gradient corresponds to a mean porosity gradient corresponding to an impregnation gradient starting from an outer surface of said support.

3. The macroporous support according to claim 2, said impregnated region and said non-impregnated region each having a plurality of pores, wherein a diameter of the pores in the impregnated region is comprised between 0.1 and 0.8 times a pore diameter in the non-impregnated region.

4. The macroporous support according to claim 3, in which the diameter of the pores in the impregnated region is comprised between 0.3 and 0.5 times the pore diameter in the non-impregnated region.

5. The macroporous support according to claim 1, in which the ratio between mean porosity of an outlet of said support and mean porosity of an inlet of said support is comprised between 1.1 and 4.

6. The macroporous support according to claim 1, in which a level of initial porosity of said non-impregnated region is comprised between 15 and 45%.

7. A membrane comprising a macroporous support according to claim 1 in association with a filtering layer.

8. The macroporous support according to claim 1 further comprising a plurality of longitudinal channels generally parallel with said at least one longitudinal channel.

9. A macroporous support for cross-flow filtration of a fluid to be treated, said support comprising a longitudinal channel adapted to receive said fluid to be treated circulating therealong, said support having fixed therein a mean porosity gradient, said mean porosity increasing in said longitudinal direction of flow, said longitudinal channel having a filtering layer lining at least a portion of said channel, said support adapted for passing said fluid to be treated from a support region of lower porosity to a support region of higher porosity.

10. The macroporous support according to claim 9, in which the mean porosity gradient corresponds to an impregnation gradient starting from an outer surface of said support, said support having an impregnated portion and a non-impregnated portion of different porosities.

11. The macroporous support according to claim 10, said impregnated region and said non-impregnated region each having a plurality of pores, wherein a diameter of the pores in the impregnated region is comprised between 0.1 and 0.8 times a pore diameter in the non-impregnated region.

12. The macroporous support according to claim 11, in which the diameter of the pores in the impregnated region is comprised between 0.3 and 0.5 times the pore diameter in the non-impregnated region.

13. The macroporous support according to claim 9, in which the ratio between mean porosity of an outlet of said support and mean porosity of an inlet of said support is comprised between 1.1 and 4.

14. The macroporous support according to claim 9, in which a level of initial porosity of a non-impregnated region of said support is comprised between 15 and 45%.

15. A membrane comprising a macroporous support according to claim 9 in association with a second filtering layer.

16. The macroporous support according to claim 9, having a layer of decreasing thickness deposited on the outer surface of the support, said layer having a smaller pore dimension than that of a pore dimension of the support, the thickness decreasing in said longitudinal direction of flow.

17. The macroporous support according to claim 16, wherein said support and layer together comprise a membrane.

18. The macroporous support according to claim 9 wherein said longitudinal channel comprises a plurality of generally parallel, longitudinal channels.

19. A macroporous support for cross-flow filtration of a fluid to be treated, comprising a plurality of longitudinal parallel channels, said fluid to be treated for circulating along said longitudinal channels, said support comprising:

inner and outer support surfaces defining a belt region, said belt region surrounding said plurality of longitudinal parallel channels;

said belt region having a first region and a second region both fixed therein, said second region having a greater porosity than said first region; and said belt region having a mean porosity gradient in the longitudinal direction, said mean porosity increasing in said longitudinal direction;

said mean porosity gradient due to said belt region having an increasing amount of said second region and a decreasing amount of said first region in said longitudinal direction;

said support adapted for passing said fluid to be treated from a support region of lower porosity to a support region of higher porosity.

20. A macroporous support as in claim 19, wherein each of said plurality of channels comprises an inlet and an outlet.

21. A macroporous support as in claim 20, wherein a ratio between said mean porosity at said outlets and said mean porosity at said inlets is comprised between about 1.1 and about 4.

22. A macroporous support as in claim 19, wherein at least some of said plurality of channels have a generally constant cross-sectional area.

23. A macroporous support as in claim 19, wherein said first region is adjacent said outer surface.

24. A macroporous support as in claim 19, wherein said belt region comprises a macroporous block, said block having an impregnation material disposed in a portion thereof to define said first region.

25. A macroporous support as in claim 24, wherein said impregnation material comprises a ceramic.

26. A macroporous support as in claim 24, wherein said impregnation material comprises a polymer.

* * * * *